(12) United States Patent
Luper et al.

(10) Patent No.: US 10,612,930 B2
(45) Date of Patent: Apr. 7, 2020

(54) NORMALIZATION OF DEVICE PROBE DATA FOR PATH IDENTIFICATION

(71) Applicant: Apple Inc., Cupertino, CA (US)

(72) Inventors: David B. Luper, Cupertino, CA (US); Francois M. Jouaux, Woodside, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 15/274,769

(22) Filed: Sep. 23, 2016

(65) Prior Publication Data

US 2018/0031382 A1 Feb. 1, 2018

Related U.S. Application Data

(60) Provisional application No. 62/367,054, filed on Jul. 26, 2016.

(51) Int. Cl.
*G01C 21/32* (2006.01)
*G08G 1/01* (2006.01)
*H04W 4/029* (2018.01)

(52) U.S. Cl.
CPC .......... *G01C 21/32* (2013.01); *G08G 1/0112* (2013.01); *G08G 1/0129* (2013.01); *G08G 1/0141* (2013.01); *H04W 4/029* (2018.02)

(58) Field of Classification Search
CPC ... G01C 21/32; G01C 21/3492; H04W 4/028; H04W 4/029; G08G 1/0112; G08G 1/0129; G08G 1/0141
USPC ........................................................ 701/422
See application file for complete search history.

(56) References Cited

U.S. PATENT DOCUMENTS

| 6,075,467 | A | * | 6/2000 | Ninagawa | G01C 21/32 340/990 |
| 6,125,323 | A | * | 9/2000 | Nimura | G01C 21/30 340/988 |
| 6,192,312 | B1 | * | 2/2001 | Hummelsheim | G01C 21/30 340/988 |
| 6,470,265 | B1 | * | 10/2002 | Tanaka | G01C 11/00 701/532 |
| 6,622,085 | B1 | * | 9/2003 | Amita | G01C 21/32 340/990 |
| 6,631,267 | B1 | * | 10/2003 | Clarkson | H04W 24/00 340/905 |
| 8,255,144 | B2 | * | 8/2012 | Breed | B60N 2/2863 340/436 |
| 8,694,241 | B1 | | 4/2014 | Kadous et al. | |
| 8,738,285 | B2 | | 5/2014 | Scofield et al. | |

(Continued)

OTHER PUBLICATIONS

A survey of video processing techniques for traffic applications_2003_Kastrinaki (Year: 2003).*

*Primary Examiner* — Angelina Shudy
(74) *Attorney, Agent, or Firm* — Invoke (57) ABSTRACT

Some embodiments provide a method for defining travel paths in a map region. The method identifies location data collected over a period of time from multiple mobile devices. The method aggregates the location data for each of multiple map areas. The aggregated data for each map area identifies an amount of mobile device traffic passing through the map area over the period of time. The method normalizes the aggregated data for a subset of the multiple map areas based on analysis of the relative amounts of mobile device traffic. The method uses the normalized data to identify paths in the map.

20 Claims, 9 Drawing Sheets

(56) References Cited

U.S. PATENT DOCUMENTS

| | | | | |
|---|---|---|---|---|
| 8,781,495 B1* | 7/2014 | Gold | G01S 5/0252 |
| | | | 455/456.1 |
| 8,972,175 B2 | 3/2015 | Annapureddy et al. | |
| 8,977,287 B1* | 3/2015 | Gold | H04W 64/00 |
| | | | 455/456.1 |
| 9,008,685 B1* | 4/2015 | Gold | H04W 72/08 |
| | | | 455/456.1 |
| 9,105,189 B2* | 8/2015 | Rubin | G08G 9/02 |
| 9,727,669 B1* | 8/2017 | Wilson | G01C 21/165 |
| 10,066,960 B2* | 9/2018 | Gearhart | G01C 21/3682 |
| 10,292,136 B2* | 5/2019 | Rubin | H04L 67/12 |
| 10,497,261 B2* | 12/2019 | Kim | G08G 1/04 |
| 2010/0188265 A1* | 7/2010 | Hill | G08G 1/0112 |
| | | | 340/905 |
| 2011/0224898 A1* | 9/2011 | Scofield | G01C 21/3492 |
| | | | 701/532 |
| 2012/0135746 A1* | 5/2012 | Mohlig | G01S 5/0018 |
| | | | 455/456.1 |
| 2013/0282271 A1* | 10/2013 | Rubin | G08G 9/02 |
| | | | 701/423 |
| 2014/0067800 A1 | 3/2014 | Sharma | |
| 2015/0377636 A1* | 12/2015 | Ding | G01C 21/30 |
| | | | 701/532 |
| 2016/0034771 A1* | 2/2016 | Schamp | G01B 11/2545 |
| | | | 348/148 |
| 2016/0091324 A1* | 3/2016 | Horihata | G08G 1/0112 |
| | | | 701/417 |
| 2017/0069214 A1* | 3/2017 | Dupray | G08G 5/0021 |
| 2018/0024565 A1* | 1/2018 | Fridman | G05D 1/0221 |
| 2018/0024568 A1* | 1/2018 | Fridman | G06K 9/00798 |
| 2018/0025235 A1* | 1/2018 | Fridman | G06K 9/00798 |
| 2019/0137290 A1* | 5/2019 | Levy | G05D 1/0214 |
| 2019/0325236 A1* | 10/2019 | Zaba | G06K 9/627 |

\* cited by examiner

| 150 | 50  | 25  | 8   | 2   | 3   | 1   | 9   |
| --- | --- | --- | --- | --- | --- | --- | --- |
| 48  | 150 | 42  | 25  | 7   | 5   | 6   | 9   |
| 23  | 48  | 149 | 49  | 55  | 43  | 51  | 50  |
| 9   | 22  | 51  | 151 | 151 | 155 | 142 | 48  |
| 2   | 7   | 19  | 53  | 42  | 55  | 51  | 149 |
| 4   | 3   | 9   | 8   | 6   | 9   | 8   | 6   |
| 0   | 1   | 4   | 1   | 9   | 3   | 3   | 4   |
| 1   | 1   | 1   | 1   | 1   | 0   | 0   | 0   |
| 0   | 3   | 1   | 4   | 1   | 1   | 1   | 0   |
| 0   | 1   | 1   | 1   | 2   | 0   | 1   | 1   |
| 2   | 0   | 2   | 2   | 0   | 2   | 1   | 6   |
| 1   | 2   | 1   | 6   | 1   | 1   | 1   | 1   |
| 3   | 1   | 1   | 0   | 0   | 0   | 2   | 0   |
| 9   | 3   | 2   | 3   | 3   | 2   | 4   | 3   |
| 5   | 10  | 8   | 9   | 8   | 7   | 9   | 9   |
| 3   | 2   | 4   | 3   | 3   | 2   | 2   | 3   |

300 — grid; 305 — top-left cell; 310 — region marker; 315 — upper region; 320 — lower region

NORMALIZATION OF DEVICE PROBE DATA FOR PATH IDENTIFICATION

BACKGROUND

Extracting street centerlines from probe traffic data is a difficult task. One approach used to accomplish this task is to count the number of probe points per "pixel" (square region) and skeletonize this rasterized surface to thin avenues of travel down to a single pixel width, as these single pixel width lines can be easily vectorized. Skeletonization is an established image processing routine but involves a technique to turn a color or grayscale image into a binary image (all pixels either black or white). In this use of skeletonization, white pixels represent streets while black pixels represent non-street locations (referred to in image processing as segmentation).

Thresholding is a common technique used to determine whether pixels are black or white. However, the use of a threshold for real-world probe data does not generally produce acceptable results, because of the drastic differences in the magnitude of probe traffic. For example, the noise around freeways may create larger amounts of probe data than the actual desired traffic on nearby residential streets. Manually varying the threshold to avoid this problem would result in an undesirable loss of automatization.

BRIEF SUMMARY

Some embodiments provide a method for defining travel paths (e.g., roads, walking paths, etc.) in a map using rasterized mobile device traffic probe data. The method uses location data that is collected over a period of time from numerous mobile devices and aggregated into numerous map areas (e.g., square regions of a map). This aggregated (rasterized) data identifies, for each map area, an amount of mobile device traffic that passed through the map area over the time period. The method uses a process to normalize the aggregated data for a subset of the map areas by analyzing the relative amounts of mobile device traffic of each map area with its surrounding map areas, and uses this normalized data to identify paths in the map.

In some embodiments, the aggregated data is normalized by first computing a gradient for each map area that identifies a direction of greatest change in amounts of mobile device traffic relative to the neighboring map areas. Some embodiments use a convolution operator, such as the Sobel operator, to compute this gradient. The method then determines, for each map area, whether the map area is a local maximum in the computed gradient direction based on the amounts of mobile device traffic of the surrounding map areas in that gradient direction (and the opposite of the gradient direction). For each map area that is a local maximum (these are map areas that are likely to be on travel paths), the method amplifies surrounding map areas that are located orthogonal to the gradient direction.

To determine whether a particular map area is a local maximum, some embodiments identify (i) a first set of map areas within a first distance of the particular map area in the gradient direction and (ii) a second set of map areas within the first distance of the particular map area in a direction opposite the gradient direction. If both of these sets have continuously increasing (or at least non-decreasing) amounts of mobile device traffic from the furthest map area in the set to the particular map area, then the particular map area is a local maximum and a likely candidate to be part of a travel path. In general, the amounts of mobile device traffic will be aggregated into a Gaussian (bell) curve around a travel path centerline, with the gradient aligned along the bell curve and orthogonal to the travel path.

Thus, for a particular map areas identified as a local maximum, the method of some embodiments identifies map areas within a second distance that are orthogonal to the gradient direction, and amplifies a value of these map areas. Some embodiments amplify the value of map areas closer to the particular local maximum map area more than map areas further from the particular local maximum map area. For example, some embodiments start with a maximum amplification value for the closest two map areas (one in either orthogonal direction), then use a decreasing function to decay the amount of amplification for map areas further away, up to the second distance. These amplification values effectively act as "votes" for the map areas, and are cumulative (i.e., the amplification value a particular map area receives based on a first local maximum map area is added to the amplification values received by the particular map area based on any other local maximum map areas).

As a result, map areas along a travel path will be amplified by many other map areas, reinforcing their belonging to the travel path. Random anomalies that have a large amount of mobile device traffic will not be reinforced, and thus these map areas (and their surrounding map areas) will have comparatively low total amplification values. Then, rather than performing thresholding using the total amount of mobile device traffic, some embodiments identify a threshold total amplification value for determining whether a map area is part of a path or not. Small residential streets with minimal traffic and freeways with hundreds of devices per minute are normalized to the same scale by the amplification process, and thus all travel paths will be picked up by the amplification process.

Once the thresholding is complete, some embodiments identify contiguous sets of map areas that meet the threshold and use these as initial locations for travel paths. Some embodiments also perform post-processing before vectorizing the travel paths, such as cleaning up the paths around intersections, handling paths with a width greater than one map area, etc. Once the post-processing is complete, this data can be used to identify travel paths in the map, which are vectorized in order to be used as map data (e.g., for use in map tiles that are provided to mobile devices upon request).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for defining travel paths (e.g., roads, walking paths, hiking trails, bike paths, etc.) in a map region using rasterized mobile device traffic probe data. The method uses location data that is collected over a period of time from numerous mobile devices and aggregated into numerous map areas (e.g., square regions of the map region). This aggregated (rasterized) data identifies, for each map area, an amount of mobile device traffic that passed through the map area over the time period. The method uses a process to normalize the aggregated data for a subset of the map areas by analyzing the relative amounts of mobile device traffic of each map area with its surrounding map areas, and uses this normalized data to identify travel paths in the map. The travel paths are incorporated into map data used to provide map tiles for electronic maps to various electronic devices, possibly including the mobile devices from which the location information was originally harvested.

Figure 1:
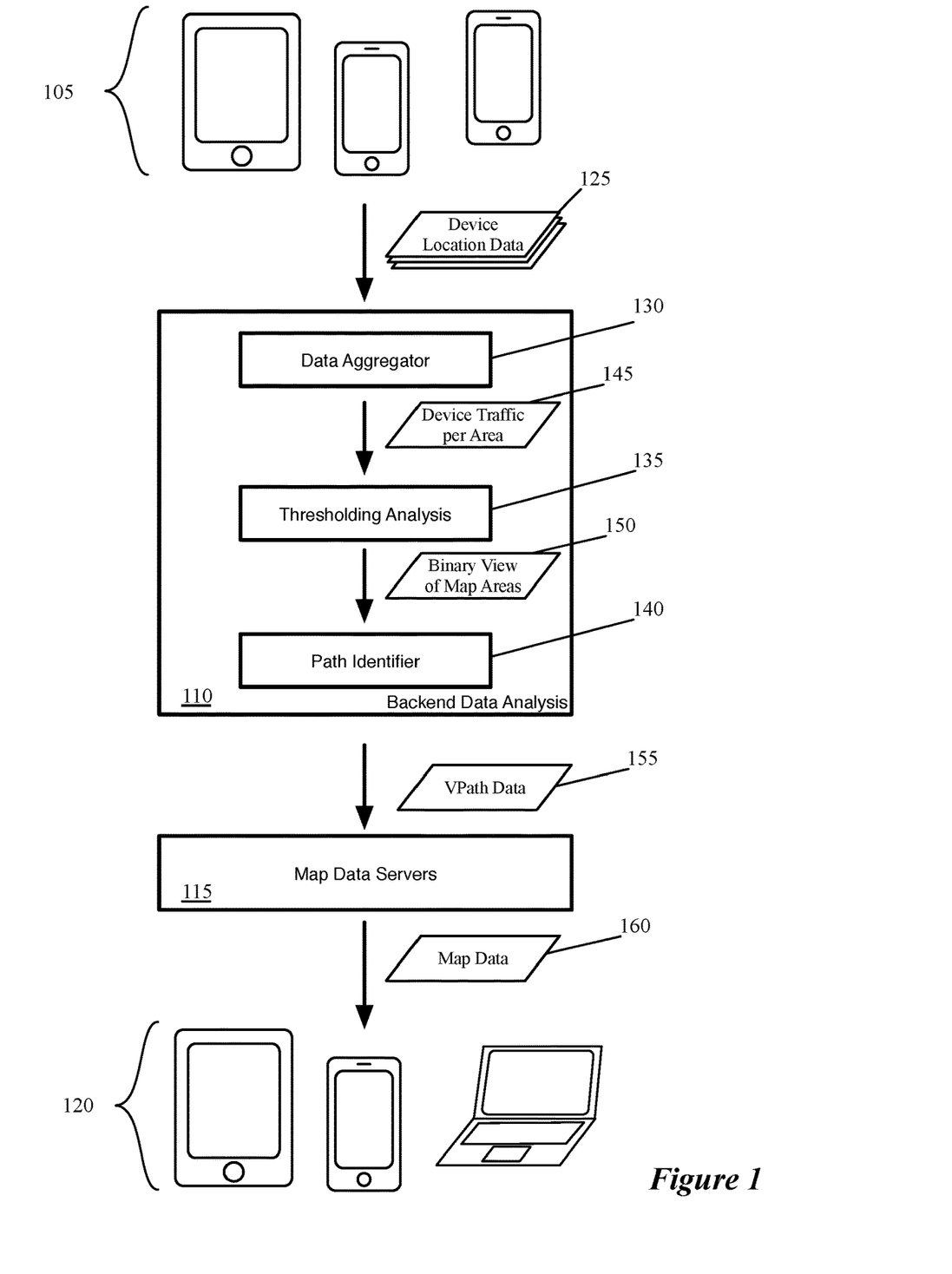
FIG. 1 conceptually illustrates the overall flow of data for a process of some embodiments, from the original mobile devices from which location data is harvested to the provision of map data (e.g., map tiles) to various electronic devices.

FIG. 1 conceptually illustrates the overall flow of data for such a process of some embodiments, from the original mobile devices 105 from which the location data is harvested to the provision of map data (e.g., map tiles) to various electronic devices 120. As shown, backend data analysis servers 110 collect mobile device location data 125 from numerous mobile devices. These mobile devices may include smart phones, media players, tablet devices, etc., so long as the device has location tracking enabled.

This device location data, in some embodiments, is collected over an extensive time period (e.g., several months, several years, etc.), so as to provide an extensive amount of data. In some embodiments, when a mobile device has location tracking turned on, the mobile device transmits its location data to various servers at regular time intervals (e.g., every second, every five seconds, etc.). The location data of some embodiments includes some or all of a location (e.g., latitude and longitude), bearing (i.e., current direction of travel), a speed of travel, a height (useful for determining overpasses and underpasses), a modal context (i.e. an indication from the device as to whether the owner is driving, walking, bicycling, etc. based on various factors), and an accuracy indicator (e.g., data from GPS may be more accurate than data extrapolated based on previous points).

In some embodiments, the location data 125 is not transmitted directly to the backend data analysis servers 110, but is instead collected by a separate set of location data intake servers (not shown) with which the mobile devices 105 communicate. These location data intake servers store the data, and provide it to the backend analysis servers 110 as needed.

The backend data analysis servers 110 include one or more servers that aggregate and analyze the location data to identify travel paths from the data. Though shown as three modules 130-140, one of ordinary skill in the art will understand that the data aggregator 130, thresholding analysis 135, and path identifier 140 may be performed on the same physical server or on different physical servers. Furthermore, each of the operations (data aggregation, thresholding analysis, and path identification) may be performed by a cluster of physical servers in parallel, and might not be performed in continuous succession (e.g., the same cluster of server computers might first perform data aggregation, then thresholding analysis, then path identification).

The data aggregator 130 receives the raw mobile device location data and aggregates this into totals for map areas of a map region (e.g., a city, state, country, etc. or portion thereof). The map areas are small contiguous "pixels" of the map region, such as rectangular (e.g., square) areas that combine to completely fill the map region. These map areas may be, e.g., 3 ft.×3 ft. squares, 2 m×2 m squares, etc. The data aggregator, in some embodiments, takes each location data point, identifies the map area to which the data point belongs based on the location information (e.g., the latitude/longitude data), and adds this to a count of mobile device traffic for the map area. The output data 145 of the data aggregator is a mobile device traffic amount for each map area in the map region, which is used as the input for the thresholding analysis 135.

The thresholding analysis 135 normalizes the aggregated data 145 to determine which map areas are above a threshold for belonging to a travel path. As described in greater detail below by reference to FIG. 2, the thresholding analysis 135 of some embodiments first computes a gradient for each map area that identifies a direction of greatest change in amounts of mobile device traffic relative to its neighboring map areas. This analysis then determines, for each map area, whether the map area is a local maximum in the direction of the computed gradient based on a comparison of the amount of mobile device traffic of the map area to the amounts of mobile device traffic of the map areas in the gradient direction (and directly opposite the gradient direction) within a first particular distance (e.g., 5 m). If a particular map area is a local maximum in its local gradient direction, the thresholding analysis amplifies neighboring map areas that are orthogonal to the local gradient direction of the particular map area. Some embodiments amplify all map areas in the orthogonal direction within a second particular distance (e.g., 25 m), providing more amplification to those closer to the particular map area than those further away.

Once this amplification process is complete, the thresholding analysis 135 identifies the map areas that are above a threshold amplification, and provides this binary view 150 of the map areas to the path identifier 140.

The binary view 150 of the map areas identifies, for each map area, whether it has been amplified above a threshold value or not. The path identifier 140 uses this data to determine travel paths for the map region (e.g., a road network, hiking and walking paths, bicycle paths, etc.). Some embodiments start with the map areas above a threshold as the initial locations for path centerlines, then use additional post-processing to further refine the data. For example, at intersections the centerlines may not be identified optimally due to, e.g., cars cutting corners while turning. As such, the path identifier 140 of some embodiments identifies the initial path centerlines, performs a first level of post-processing, vectorizes the path centerlines, and performs additional post-processing (e.g., geometric post-processing). The path identifier outputs vectorized path data 155.

This vectorized path data 155 is incorporated into map tiles by additional backend servers. For example, some embodiments use the processes described in U.S. Pat. Nos. 9,235,906 and 9,395,193, which are incorporated herein by reference, in generating map tiles based on the vector data. These map tiles are stored by a set of map servers 115, from which various mobile (and non-mobile) devices 120 request and receive map data 160 (e.g., as map tiles). The devices 120 may include mobile devices from which the location data 125 was harvested in the first place, but may also include other mobile devices (e.g., newer devices, devices whose owners do not turn on location tracking, non-mobile devices such as laptops or desktops, etc.).

Figure 2:
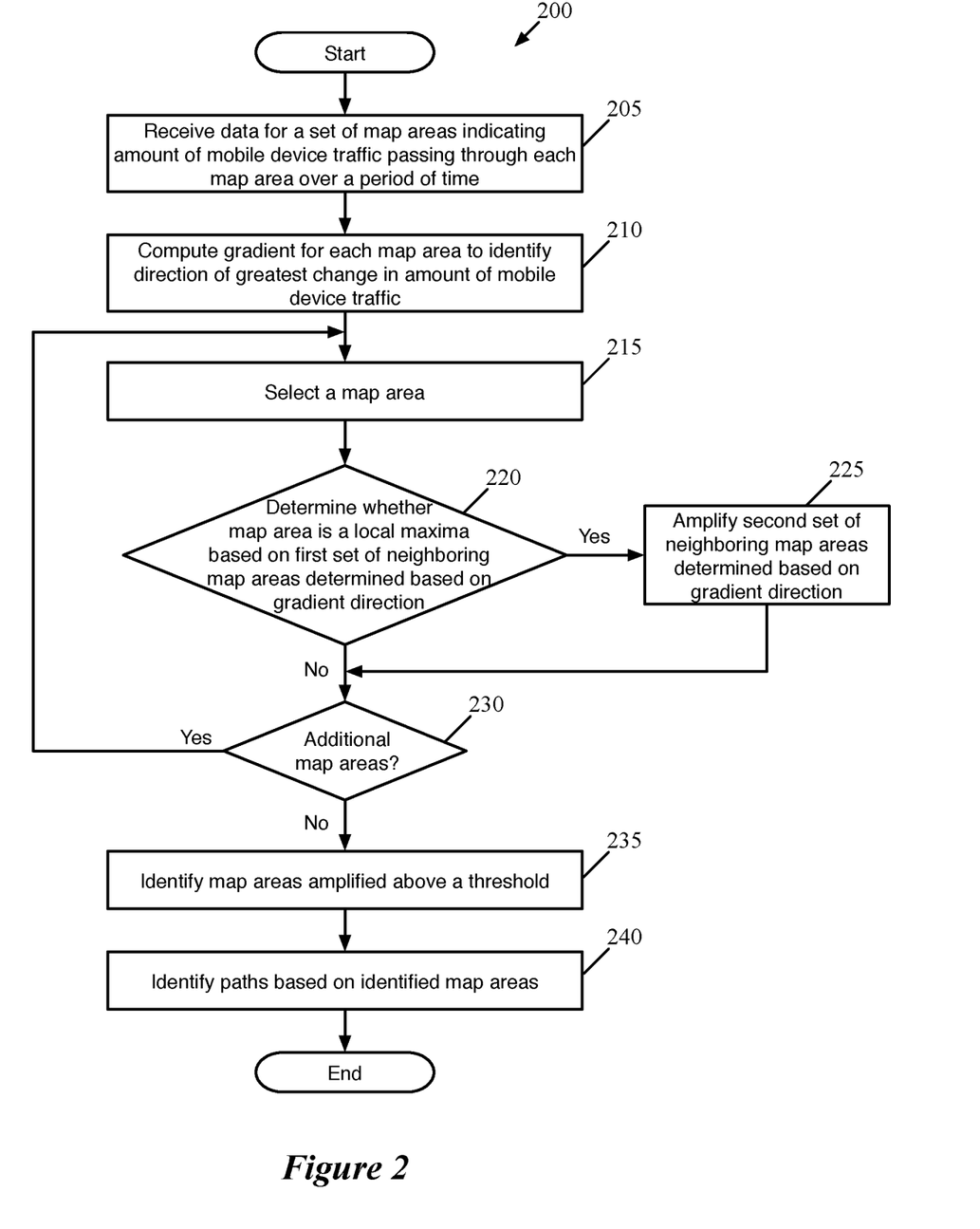
FIG. 2 conceptually illustrates a process of some embodiments for identifying paths within a map region using aggregated mobile device location data.

FIG. 2 conceptually illustrates a process 200 of some embodiments for identifying paths within a map region using aggregated mobile device location data. The process 200, in some embodiments, is performed at least in part by a backend server or cluster of servers such as the backend analysis servers 110 (and, specifically, by the threshold analysis module 135). This process 200 will be described in part by reference to FIGS. 3-8, which illustrate examples of the analysis of aggregated mobile device traffic data.

As shown, the process 200 begins by receiving (at 205) data for a set of map areas indicating an amount of mobile device traffic passing through each map area over a period of time. This mobile device traffic data, in some embodiments, is collected over an extensive time period (e.g., several months, several years, etc.), so as to provide an extensive amount of data. In some embodiments, when a mobile device has location tracking turned on, the mobile device transmits its location (as well as additional data) to various servers at regular time intervals (e.g., every second, every five seconds, etc.). This raw location data is aggregated into totals for map areas of a map region in some embodiments. The map areas are small contiguous "pixels" of the map region, such as rectangular (e.g., square) areas (e.g., 2 ft.×2 ft., 1 m×1 m, etc. areas) that combine to completely fill the map region. Each of the raw location data points belongs to one of the map areas (i.e., based on its latitude/longitude coordinates), and these data points are added to a count of mobile device traffic for the map area that is used for the path identification process 200.

Figure 3:
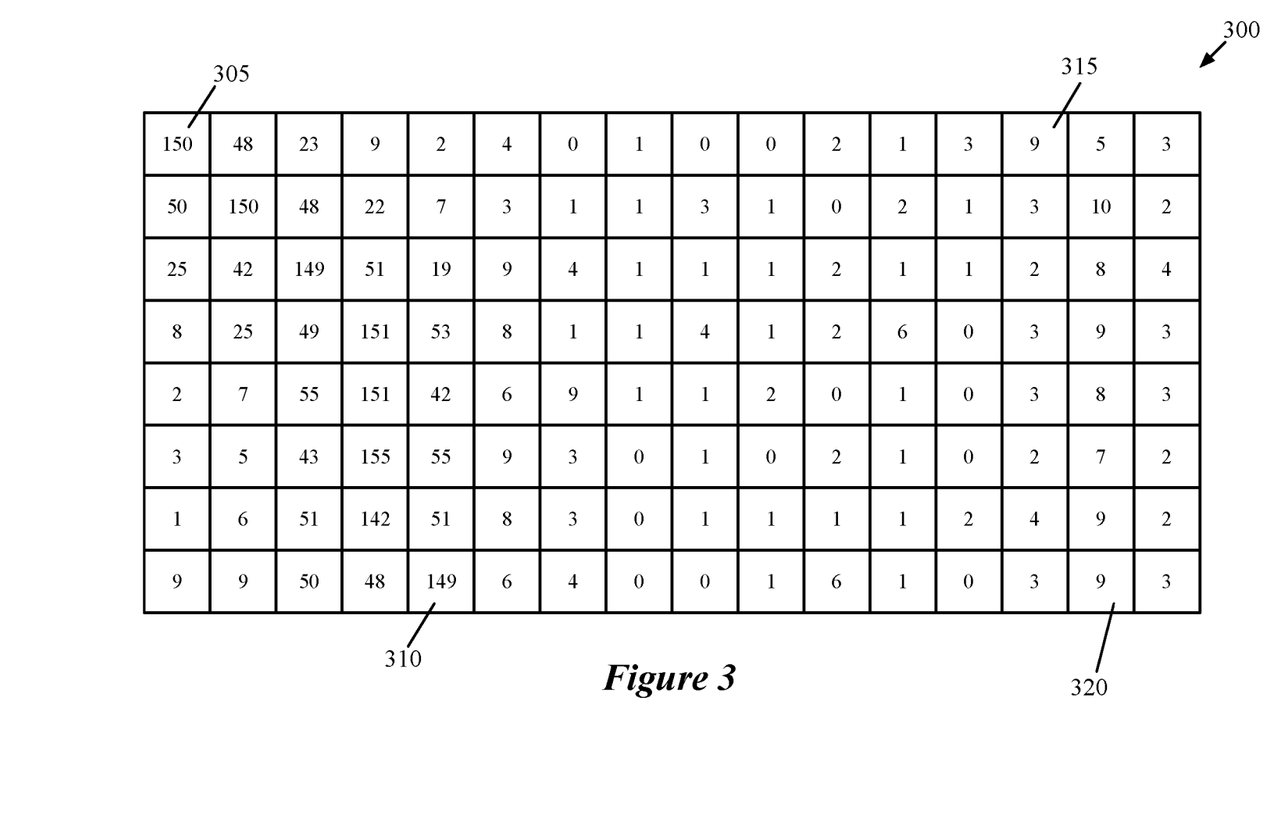
FIG. 3 conceptually illustrates a map region containing 128 map areas.

FIG. 3 conceptually illustrates a map region 300 containing 128 map areas. These map areas are shown as squares that represent square sections of the earth's surface, projected upwards. These projections may be square columns (i.e., rectangular prisms) or projections that expand outwards with larger cross-sections as the projections moves further from the earth's surface, to account for the curvature of the earth. The numbers in the squares represent an amount of mobile device traffic for each map area over a period of time (e.g., 6 months, 1 year, etc.). For simplicity, the numbers are shown ranging from 0 to 155, but it should be understood that in practice the maximum amount of mobile device traffic for a map region will be much larger (e.g., in the hundreds of thousands, if not millions, of devices) for an extended time period, and that there will be very few, if any, map areas over land with no mobile device traffic at all.

As shown in the figure, there is a concentration of larger amounts of mobile device traffic on the left half of the map region 300, specifically starting at the top left map area 305 and proceeding down and right to the map area 310. In addition, while the right half of the map area 300 has significantly less mobile device traffic (e.g., such that the map region 300 is indicative of a residential area on the right half near a freeway on the left half), there is nevertheless a linear section of relatively larger amounts of mobile device traffic proceeding downwards from map area 315 to map area 320. While these patterns are easy for the human eye to identify, this is not a realistic solution for large map regions with thousands or millions of map areas. However, simple thresholding by a computing device will not detect the relatively larger area on the right half without picking up most of the map areas on the left half.

Returning to FIG. 2, the process 200 computes (at 210) a gradient value for each map area, in order to identify a direction of greatest change in the amount of mobile device traffic for each map area. Some embodiments use a convolution operator, such as the Sobel operator, to compute this gradient. The gradient takes into account some number of neighboring areas (e.g., a 3×3 or 5×5 region centered on the map area) to determine a magnitude and direction of greatest change in mobile device traffic amounts associated with a map area. For determining travel paths, some embodiments are only concerned with the direction of the gradient, rather than the magnitude.

Figure 4:
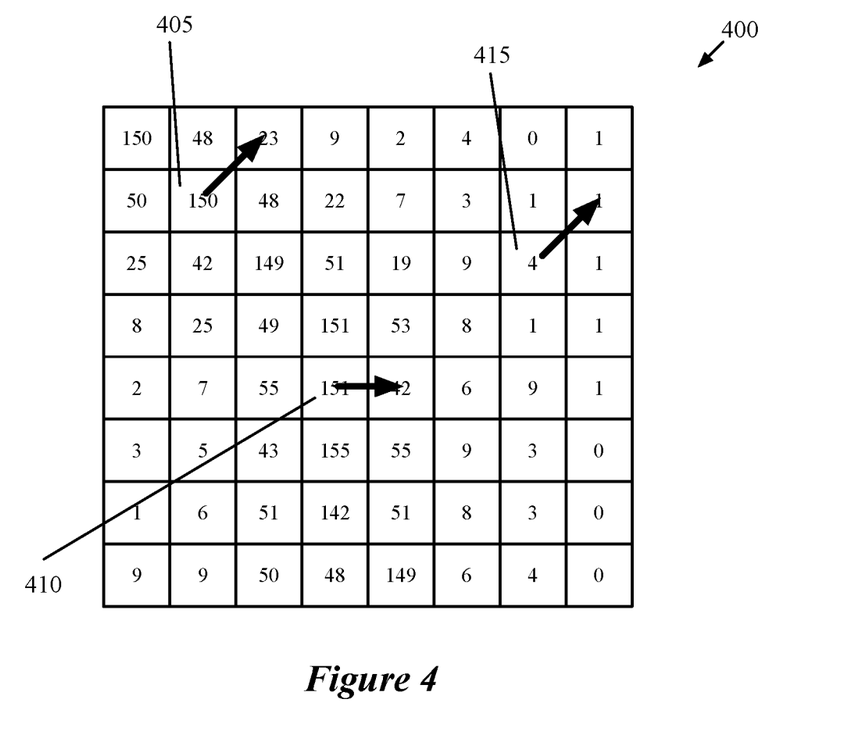
FIG. 4 illustrates approximate computed gradient directions for several map areas of a map region, which is the left half of the map region of FIG. 3.

FIG. 4 illustrates approximate computed gradient directions for several map areas of a map region 400, which is the left half of the map region 300. Specifically, this figure shows two map areas 405 and 410 that are along the likely travel path as well as a third map area 415 that is not. As shown, the first map area 405 has a gradient direction angled up and right, the second map region 410 has a gradient direction that points horizontally to the right, and the third map region 415 has a gradient direction that points up and right. These gradient directions are shown as approximates, and one of ordinary skill in the art would recognize that the gradient direction for a map area need not actually be directed from the center of the map area to the center of one of the eight neighboring map areas, but instead may fall in between these directions.

With the gradients computed, the process 200 performs the amplification for map areas that meet specific criteria. As shown, the process selects (at 215) a map area. The process may select the map areas randomly, in an organized order through the map region, etc. In addition, it should be understood that the process 200 is a conceptual process, and that some embodiments will perform the operations 220-235 on multiple map areas in parallel.

The process 200 then determines (at 220) whether the selected map area is a local maximum based on a first set of neighboring map areas that are determined according to the gradient direction. To determine whether a particular map area is a local maximum, some embodiments identify (i) a first set of map areas within a first distance of the particular map area in the gradient direction and (ii) a second set of map areas within the first distance of the particular map area in the direction opposite the gradient direction. If both of these sets have continuously increasing (or at least non-decreasing) amounts of mobile device traffic from the furthest map area in the set to the particular map area, then the particular map area is a local maximum and a likely candidate to be part of a travel path.

In general, the amounts of mobile device traffic will be aggregated into a Gaussian (bell) curve around a travel path centerline at the maximum of the bell curve, with the gradient aligned along the bell curve and orthogonal to the travel path. Thus, for each map area, the process identifies all of the map areas within a predefined distance (e.g., 6 m, 40 ft., etc.) of the map area along the gradient (and opposite to the gradient). If the gradient is not aligned exactly with one of the eight immediately surrounding areas (i.e., at 0, 45, 90, 135, 180, 225, 270, or 315 degrees), then this identified set of map areas may not be in a straight line within the grid of map areas. For a particular map area to be classified as a local maximum, some embodiments simply determine whether all of the identified surrounding areas on both sides have less mobile device traffic than the particular map area. Other embodiments require (separately, from each of the sets of map areas on either side of the particular map area) that the amounts of mobile device traffic be monotonically increasing from the outermost map area in the set to the particular map area. Other embodiments use other tests, such as looking at only the map area a particular distance away or only the nearest map area in either direction. Using only the map area located a particular distance away enables more map areas that are close to a travel path centerline to be treated as a local maximum even if the nearest neighboring map area has a slightly larger amount of mobile device traffic.

Figure 5:
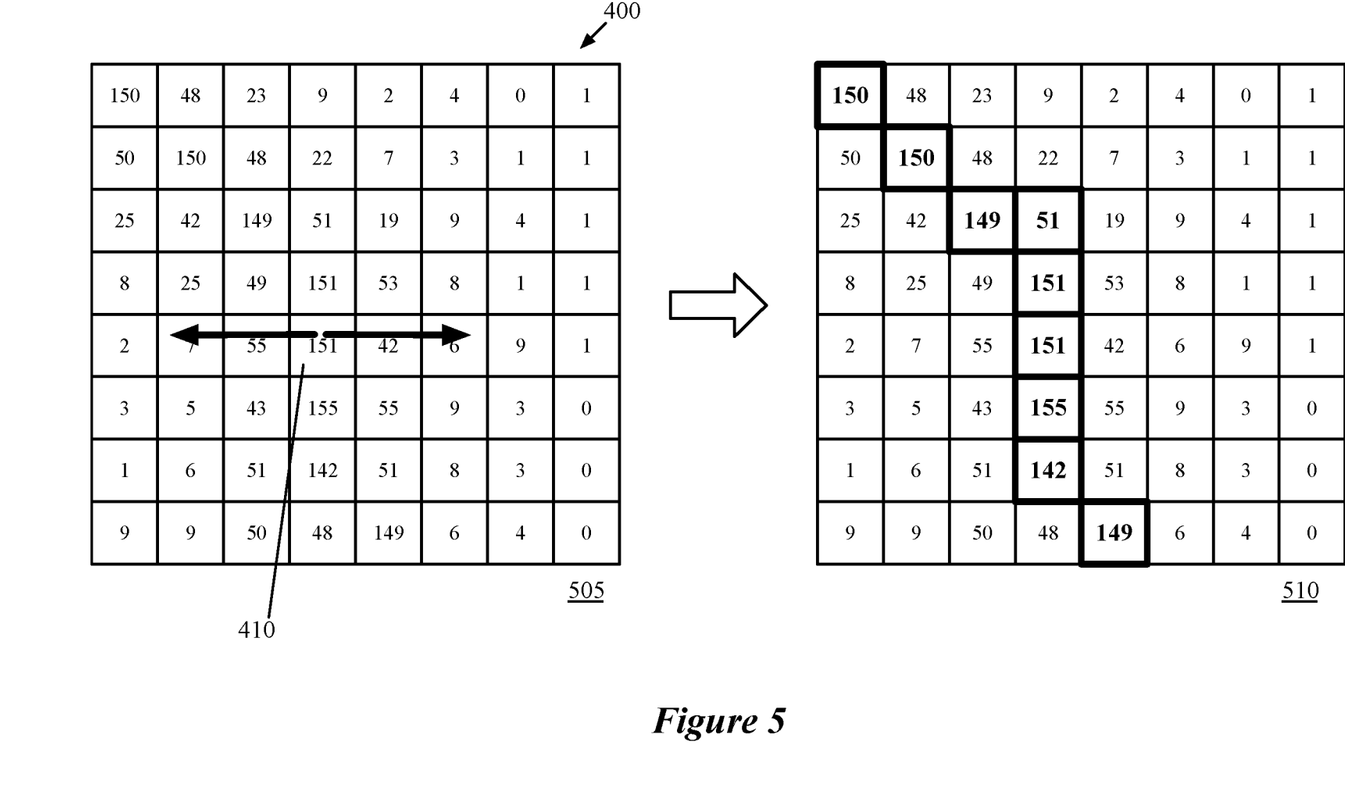
FIG. 5 illustrates an indication of local maxima in the map region of FIG. 4.

FIG. 5 illustrates an indication of local maxima in the map region 400. The first stage 505 illustrates the sets of map areas used to determine whether the map area 510 is a local maximum. As the gradient is horizontal in this case, the normalization and thresholding process identifies the map areas a pre-specified distance (in this case, two map area widths) to either side of the map area 510, and determines that all of these areas have less mobile device traffic than the map area 510. The second stage 510 illustrates (via larger, bold numbers and thicker lines) the map areas identified as local maxima in the gradient direction. In this simple case, the local maxima mostly align with the highest mobile device traffic amounts (i.e., the suspected travel path). However, in some cases the number of areas treated as such will be larger (e.g., if only a single map area on either side, located several map area widths away, is used for comparison), and sometime random anomalies will appear as local maxima.

When the selected map area is a local maximum, the process amplifies (at 225) a second set of neighboring map areas that are also determined based on the gradient direction. Whereas the first set of neighboring map areas (used to determine if the selected map area is a local maximum) are along the gradient, the second set of neighboring map areas are orthogonal to the gradient in some embodiments. Some embodiments amplify the value of map areas closer to the selected map area more than map areas further from the selected map area. For example, some embodiments start with a maximum amplification value for the closest two map areas (one in either orthogonal direction), then use a decreasing function to decay the amount of amplification for map areas further away, up to the second distance. These amplification values effectively act as "votes" for the map areas, and are cumulative (i.e., the amplification value a particular map area receives based on a first local maximum map area is added to the amplification values received by the particular map area based on any other local maximum map areas).

Figure 6:
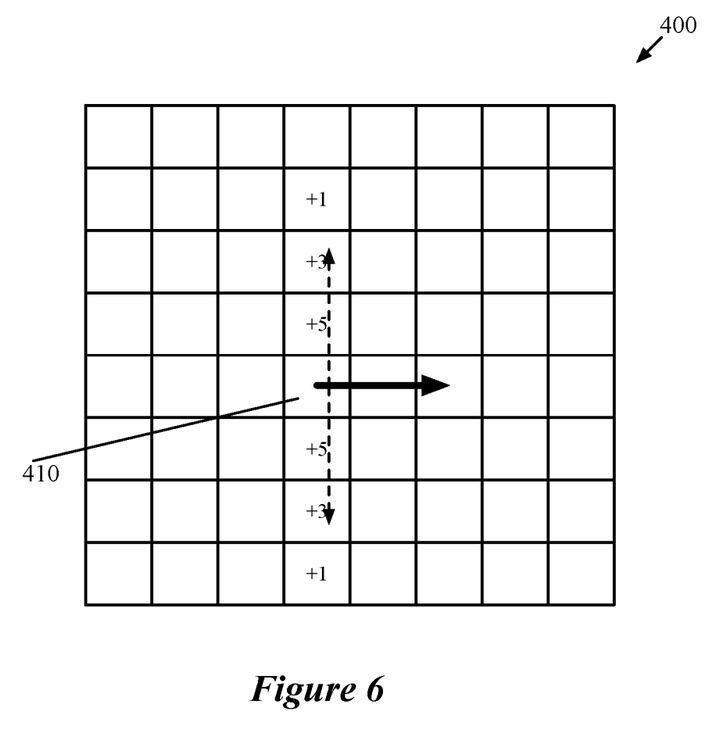
FIG. 6 conceptually illustrates the amplification of neighboring map areas for a map area in the map region of FIG. 4.

Rather than amplify the actual mobile device traffic amounts for each map area, some embodiments use a separate value for each map area, that starts at 0 for all map areas in the region. Each time a selected map area is a local maximum, the process amplifies multiple neighboring map areas (orthogonal to the gradient for the selected map area) by adding to this separate value for the neighboring map areas. FIG. 6 conceptually illustrates this for the map area 410 of the map region 400. In this example, the map area 410 is a local maximum with a horizontal gradient. As such, the normalization and thresholding process amplifies the neighboring map areas located above and below the map area 410. In this example, the process adds five to the amplification value for the closest map area on either side, three for the next map area on either side, and one for the third map area on either side. Other embodiments might go significantly further, and use a pre-specified distance rather than a number of map areas (which could be a different number of map areas in diagonal directions as compared to horizontal/vertical directions). In addition, different monotonically decreasing functions might be used to identify the amplification value for each map area as a function of its distance from the selected local maximum map area. In addition, some embodiments amplify the selected local maximum map area as well, while other embodiments do not.

The process 200 then determines (at 230) whether additional map areas remain to be tested for local maximum characteristics and used to amplify nearby map areas. If additional areas remain, the process returns to 215 to select another map area. As a result, map areas along a travel path will be amplified by many other map areas, reinforcing their belonging to the travel path (by increasing the cumulative amplification value for these map areas). Random anomalies that have a large amount of mobile device traffic will not be reinforced, and thus these map areas (and their surrounding map areas) will have comparatively low total amplification values.

Once all of the map areas are analyzed and the amplification is complete, the process identifies (at 235) the map areas in the map region that are amplified above a threshold (rather than performing thresholding using the total amount of mobile device traffic). This threshold is pre-specified (e.g., based on testing to determine an optimal threshold) in some embodiments. Because small residential or out-of-the-way roads will exhibit similar properties (at smaller scale) to major roads and freeways, and even to hiking or bicycling paths, the corresponding map areas should have similar amplification values.

Figure 7:
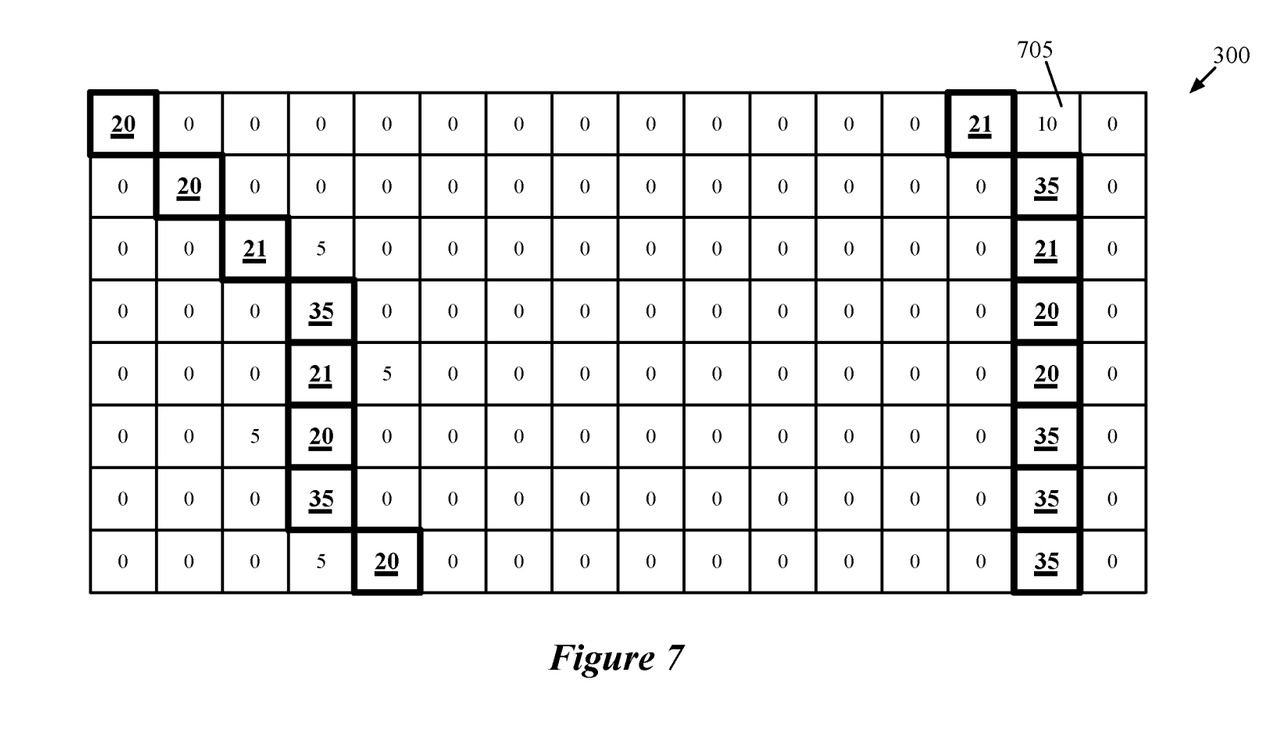
FIG. 7 illustrates the map region with example amplification values for all of the map areas in the map region of FIG. 3.

FIG. 7 illustrates the map region 300 with example amplification values for all of the map areas in the region. Because this is a simplified example, a large percentage of the map areas have zero cumulative amplification, and the totals are not that high even for the map areas that are along the likely travel paths. In actual map regions, there would often be anomalies that lead to isolated local maxima and thus occasional minor amplification of isolated map areas. In the illustrated example, a threshold of 15 is used. The map areas that are above this threshold are shown with the numbers larger and bolded/underlined and with the border width increased. Several neighboring map areas (e.g., map area 705) have non-zero amplification values but do not make the threshold value.

Once the thresholding is complete, the process 200 of some embodiments identifies (at 240) paths based on the identified map areas. As described above by reference to FIG. 1, in some embodiments this part of the process is actually performed by a separate module or even a separate set of computers. In addition, some embodiments use the identified sets of map areas as a starting point for the travel paths, while performing additional processing as well. For example, some embodiments identify contiguous sets of map areas that meet the amplification value threshold and use these as initial locations for travel paths (e.g., vectorizing these sets of locations).

Figure 8:
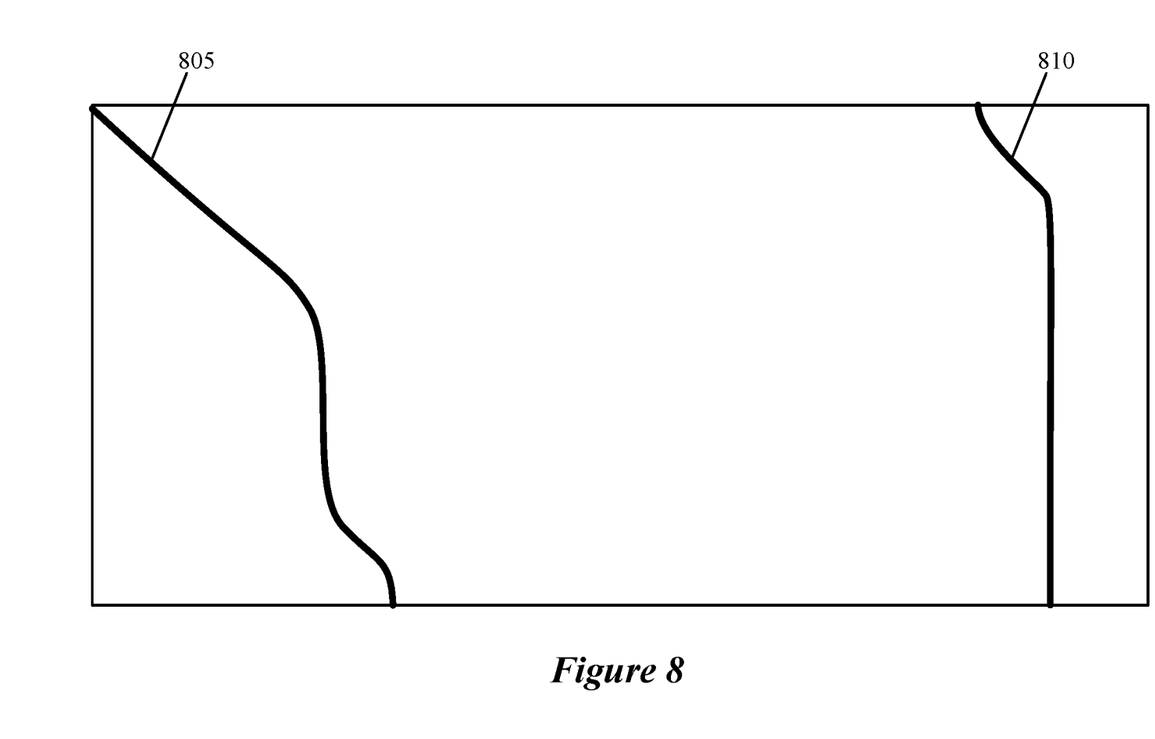
FIG. 8 conceptually illustrates the resultant paths based on the mobile device traffic data shown in FIG. 3.

Some embodiments also perform additional post-processing either before and/or after vectorizing the travel paths, such as cleaning up the paths around intersections, handling paths with a width greater than one map area, etc. For instance, at intersections often the most mobile device traffic will not continue on a line all the way through the intersection, and instead cut corners when making turns. Some embodiments use various post-processing techniques to identify broken paths or sets of map areas at such intersections and correct the centerlines. Once the post-processing is complete, this data can be used to identify travel paths in the map, which are vectorized in order to be used as map data (e.g., for use in map tiles that are provided to mobile devices upon request). FIG. 8 conceptually illustrates the resultant paths 805 and 810 in the map region 300 based on the mobile device traffic data shown in FIG. 3. Though shown in this diagram as the same thicknesss, in actuality these might represent a major thoroughfare and a walking path, a freeway and a residential street, etc.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
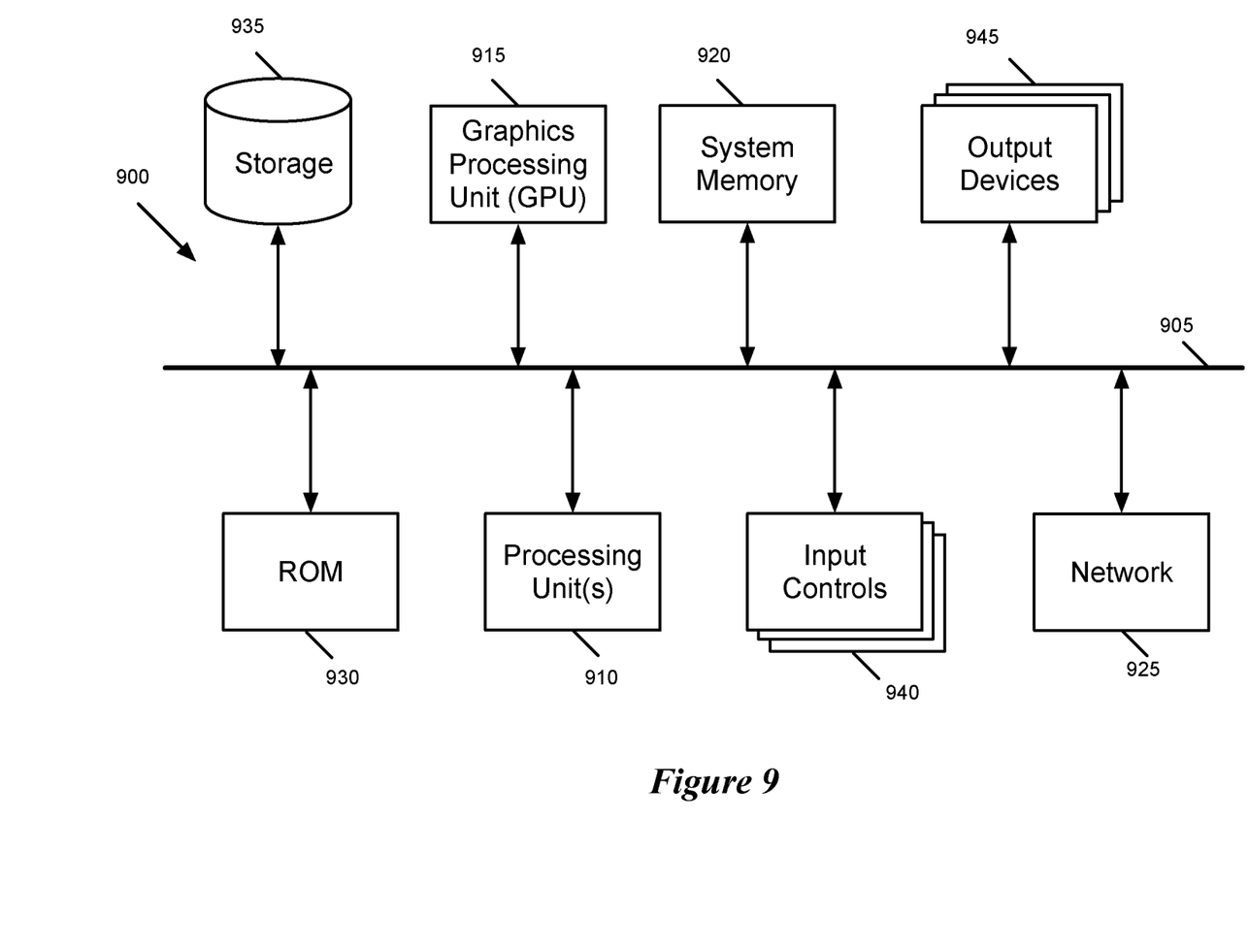
FIG. 9 conceptually illustrates an example of an electronic system with which some embodiments of the invention are implemented.

FIG. 9 conceptually illustrates an example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 910, a graphics processing unit (GPU) 915, a system memory 920, a network 925, a read-only memory 930, a permanent storage device 935, input controls 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910. In some embodiments, such functionality can be provided using CoreImage's kernel shading language.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935.

Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input controls 940 and output devices 945. The input controls 940 enable the user to communicate information and select commands to the electronic system. The input controls 940 include alphanumeric keyboards, touch controls, pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices.

Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for defining travel paths in a map region, the method comprising:
    identifying location data collected over a period of time from a plurality of mobile devices;
    aggregating the location data for a plurality of map areas, the aggregated location data identifying mobile device traffic passing through each map area of the plurality of map areas over the period of time;
    normalizing the aggregated location data for the plurality of map areas;
    identifying that a first amount of mobile device traffic for the first map area exceeds amounts of mobile device traffic for the one or more contiguous map areas;
    based on the identification, determining that the first map area is a local maximum;
    incrementing an amplification value for at least one map area of the one or more contiguous map areas, wherein the amplification value represents a likelihood that the at least one map area is included within a travel path; and
    determining, based on the normalized aggregated location data, a first travel path passing through the first map area.

2. The method of claim 1, further comprising computing a gradient for a first map area of the plurality of map areas by identifying a direction of change in mobile device traffic from the first map area to one or more contiguous map areas, wherein the gradient is computed using a convolution operator.

3. The method of claim 1, wherein determining whether the map area is the local maximum comprises:
    identifying (i) at least one map area in a first direction of change from the first map area and (ii) at least one map area in a second direction opposite the first direction of change from the first map area; and
    determining that the amount of mobile device traffic for the first map area is greater than the amounts of mobile device traffic for the identified map areas.

4. The method of claim 1, further comprising:
    identifying map areas in a direction orthogonal to the direction of change within a threshold distance of the first map area; and
    incrementing an amplification value for each of the identified map areas.

5. The method of claim 4, wherein identified map areas closer to the particular map area are amplified more than identified map areas further from the particular map area.

6. The method of claim 1, wherein a first map area is in a second set of neighboring map areas for a plurality of map areas.

7. The method of claim 1, wherein (i) a first map area is amplified by being in the contiguous map areas for a second map area and (ii) the second map area is amplified by being in the contiguous map areas for a first map area.

8. The method of claim 1, wherein determining the first travel path based on the normalized aggregated location data comprises:
    identifying map areas with at least a threshold amplification; and
    identifying one or more contiguous sets of identified map areas as one or more travel paths in the map.

9. The method of claim 1, wherein the identified paths comprise at least one of roads, walking paths, and bicycle paths, wherein the identified location data comprises travel modalities, wherein the travel modalities are used to determine a type of path for at least a subset of the identified paths.

10. The method of claim 1, wherein the identified path locations are for defining a network of paths in the map region.

11. The method of claim 1, wherein the identified location data comprises a plurality of latitude/longitude points collected from the plurality of mobile devices.

12. The method of claim 1, wherein the identified paths are for incorporation into map tiles for distribution to a plurality of electronic devices.

13. The method of claim 12, wherein the plurality of electronic devices comprises a subset of the plurality of mobile devices.

14. The method of claim 1, further comprising:
determining that the first map area is a first local maximum compared to one or more contiguous map areas;
determining that a second map area of the one or more contiguous map areas is a second local maximum compared to contiguous map areas relative to the second map area;
generating a vector between the first map area and the second map area; and
identifying the vector as the first travel path.

15. The method of claim 14, further comprising:
receiving a request for map data for a map region;
determining that the requested map region includes the first map area;
including the first travel path in a map tile; and
providing the map tile included within map data for the requested map region.

16. The method of claim 1, further comprising:
defining a threshold amplification value;
determining that the amplification value for the at least one map area exceeds the threshold amplification value; and
based on determining that the amplification value exceeds the threshold amplification value, determining a travel path that includes the at least one map area.

17. A non-transitory machine readable medium storing a program which when executed by at least one processing unit defines travel paths in a map region, the program comprising sets of instructions for:
identifying location data collected over a period of time from a plurality of mobile devices;
aggregating the location data for a plurality of map areas, the aggregated location data identifying mobile device traffic passing through each map area of the plurality of map areas over the period of time;
normalizing the aggregated location data for the plurality of map areas;
identifying that a first amount of mobile device traffic for the first map area exceeds amounts of mobile device traffic for the one or more contiguous map areas;
based on the identification, determining that the first map area is a local maximum;
incrementing an amplification value for at least one map area of the one or more contiguous map areas, wherein the amplification value represents a likelihood that the at least one map area is included within a travel path; and
determining, based on the normalized aggregated location data, a first travel path passing through the first map area.

18. The non-transitory machine readable medium of claim 17, wherein the program further comprises sets of instructions for:
identifying (i) at least one map area in a first direction of change from the first map area and (ii) at least one map area in a second direction opposite the first direction of change from the first map area; and
determining that the amount of mobile device traffic for the first map area is greater than the amounts of mobile device traffic for the identified map areas.

19. The non-transitory machine readable medium of claim 17, wherein the program further comprises sets of instructions for:
identifying map areas in a direction orthogonal to the direction of change within a threshold distance of the first map area; and
incrementing an amplification value for each of the identified map areas.

20. The non-transitory machine readable medium of claim 17, wherein the set of instructions for determining the first travel path based on the normalized aggregated location data comprises:
identifying map areas with at least a threshold amplification; and
identifying one or more contiguous sets of identified map areas as one or more travel paths in the map.

* * * * *